United States Patent [19] [11] Patent Number: 4,495,930
Nakajima [45] Date of Patent: Jan. 29, 1985

[54] FUEL CONTROL SYSTEM
[75] Inventor: Yasuo Nakajima, Yokosuka, Japan
[73] Assignee: Nissan Motor Company, Limited, Japan
[21] Appl. No.: 287,180
[22] Filed: Jul. 27, 1981
[30] Foreign Application Priority Data
Jul. 28, 1980 [JP] Japan .................... 55-103314
[51] Int. Cl.³ ............... F02B 75/12; F02D 19/08
[52] U.S. Cl. ................... 123/575; 123/1 A; 123/478
[58] Field of Search ............ 123/575, 576, 577, 578, 123/478, 1 A, 179 L, 179 G, 445, 470
[56] References Cited
U.S. PATENT DOCUMENTS

| | | | |
|---|---|---|---|
| 2,337,982 | 12/1943 | Ericson | 123/575 |
| 3,707,955 | 1/1973 | Ulbing | 123/575 |
| 3,826,237 | 7/1974 | Csicsery et al. | 123/179 L |
| 4,019,477 | 4/1977 | Overton | 123/577 |
| 4,031,864 | 6/1977 | Crothers | 123/575 |
| 4,090,484 | 5/1978 | Itoh et al. | 123/577 |
| 4,242,992 | 1/1981 | Kawamura et al. | 123/179 L |
| 4,317,440 | 3/1982 | Thatcher et al. | 123/470 |
| 4,327,675 | 5/1982 | Takeda | 123/470 |
| 4,342,287 | 8/1982 | Concepcion | 123/575 |
| 4,345,561 | 8/1982 | Kondo et al. | 123/478 |

FOREIGN PATENT DOCUMENTS

| | | | |
|---|---|---|---|
| 0027689 | 4/1981 | European Pat. Off. | 123/577 |
| 2148506 | 4/1973 | Fed. Rep. of Germany . | |
| 2301307 | 8/1973 | Fed. Rep. of Germany . | |

Primary Examiner—Parshotam S. Lall
Assistant Examiner—W. R. Wolfe
Attorney, Agent, or Firm—Lowe, King, Price & Becker

[57] ABSTRACT

An internal combustion engine operable on two kinds of fuel properly selected according to engine operating conditions. A control system is provided which controls the total amount of fuel supplied to the engine in response to intake air flow and controls the ratio between the amounts of the two kinds of fuel supplied to the engine in response to engine load.

23 Claims, 7 Drawing Figures

FIG.1

SPEED SENSOR 92
AIRFLOW SENSOR 94
THROTTLE POSITION SENSOR 96
MANIFOLD PRESSURE SENSOR 98

FUEL CONTROL SYSTEM

BACKGROUND OF THE INVENTION

This invention relates to an internal combustion engine operable on two kinds of fuel provided in amounts which are controlled in accordance with engine operating conditions.

In recent years, the reduction of petroleum consumption has become of prime concern. Consequently, it is desired to save gasoline by using alcohol, such as ethanol or methanol, as a fuel on which automobile engines operate. Attempts have been made to operate automobile engines on gasoline fuel mixed with alcohol, but such attempts have failed to make the efficient use of the advantages of alcohol. They did not provide the desired energy conversion efficiency although they did achieve a saving in petroleum (gasoline) consumption.

Alcohol has a high octane number of 100 or more and a high degree of latent heat, that is, the heat required for vaporization. Ethanol has a latent heat three times as high as gasoline and methanol has a latent heat four times as high as gasoline. One of the great advantages of Alcohol fuel as opposed to gasoline fuel is the capacity of providing a high compression ratio owing to its higher octane number and owing to the cooling effect of its higher latent heat. For example, an alcohol fuel containing 100 percent methanol can increase the compression ratio as much as 15 to 1.

With gasoline fuel, alternatively, the compression ratio is limited to below 8.5 to 1 or 9 to 1 owing to its low octane number due to anti-knock considerations. It can be seen that with a gasoline fuel into which alcohol is incorporated, the compression ratio should be determined based upon the octane number of the gasoline fuel and therefore the heat energy content of the alcohol is utilized insufficiently.

Alcohol has a low boiling point. The boiling point of methanol is at 64° C. and that of ethanol is at 78° C. The use of alcohol fuel for gasoline engines tends to spoil their starting and warming up capabilities.

In Brazil, alcohol fueled motor vehicles are marketed. These vehicles are equipped with a mechanism which controls the fuel supplied to the engine in such a manner that the engine operates on gasoline fuel during start up operation and on alcohol fuel after starting.

Another kind of fuel control system for alcohol fueled engine is also proposed in which the engine operates on gasoline fuel during start up and warming up operations and on alcohol fuel during normal operation, that is, operation after the warming up has completed.

In the above two cases, the change of the kind of fuel supplied to the engine from gasoline to alcohol depends on the three operating conditions of the engine, i.e. starting up, warming up and normal operating conditions. Since the fuel change is performed while the engine load is not drastically changing, a relatively simple and low response control system for changing fuel is employed.

However, when fuel change is required in accordance with the engine load, the control device must perform smooth and quick response fuel change, since the engine load is changed very frequently during normal engine operating condition.

The present invention, therefore, provides an internal combustion engine operable on two kinds of fuel properly selected with a high response to engine load conditions and smoothly operable without any output torque variations, at the chance of selection of fuel from one kind to the other. The present invention can make efficient use of the advantages of both kinds of fuel and save gasoline without any reduction in engine drivability.

SUMMARY OF THE INVENTION

There is provided in accordance with the present invention an internal combustion engine having an intake passage provided therein with a throttle valve. The engine comprises a first fuel injector for discharging, into the intake passage, a first kind of fuel having a calorific value, and a second fuel injector for discharging, into the intake passage, a second kind of fuel with a calorific value different from that of the first kind of fuel. The first and second fuel injectors are driven by a control system which controls the amounts of the first and second kinds of fuel discharged into the intake passage. The control system determines a basic value of the amount of the first kind of fuel to provide a caloric value required for the engine in response to air flow to the engine. The control system additionally determines a ratio between the amounts of the first and second kinds of fuel discharged into the intake passage in response to engine load. The control system determines the amounts of the first and second kinds of fuel to be discharged into the intake passage from parameters including the determined basic value and ratio so that the total of the caloric values of the first and second kinds of fuel discharged corresponds to the caloric value of the basic amount of the first kind of fuel.

The first and second fuel injectors may be electromagnetically operated fuel injectors repeatedly energized to discharge fuel for time periods corresponding to the pulse widths of first and second injection command signals. In this case, the control system determines a basic pulse width in response to air flow to the engine, determines the ratio between the pulse widths of the first and second injection command signals in response to engine load, and determines the pulse widths of the first and second injection command signals from the determined basic pulse width and the determined pulse width ratio.

BRIEF DESCRIPTION OF THE DRAWINGS

The present invention will be described in greater detail by reference to the following description taken in connection with the accompanying drawings, in which.

DESCRIPTION OF THE PREFERRED EMBODIMENT

Figure 1:
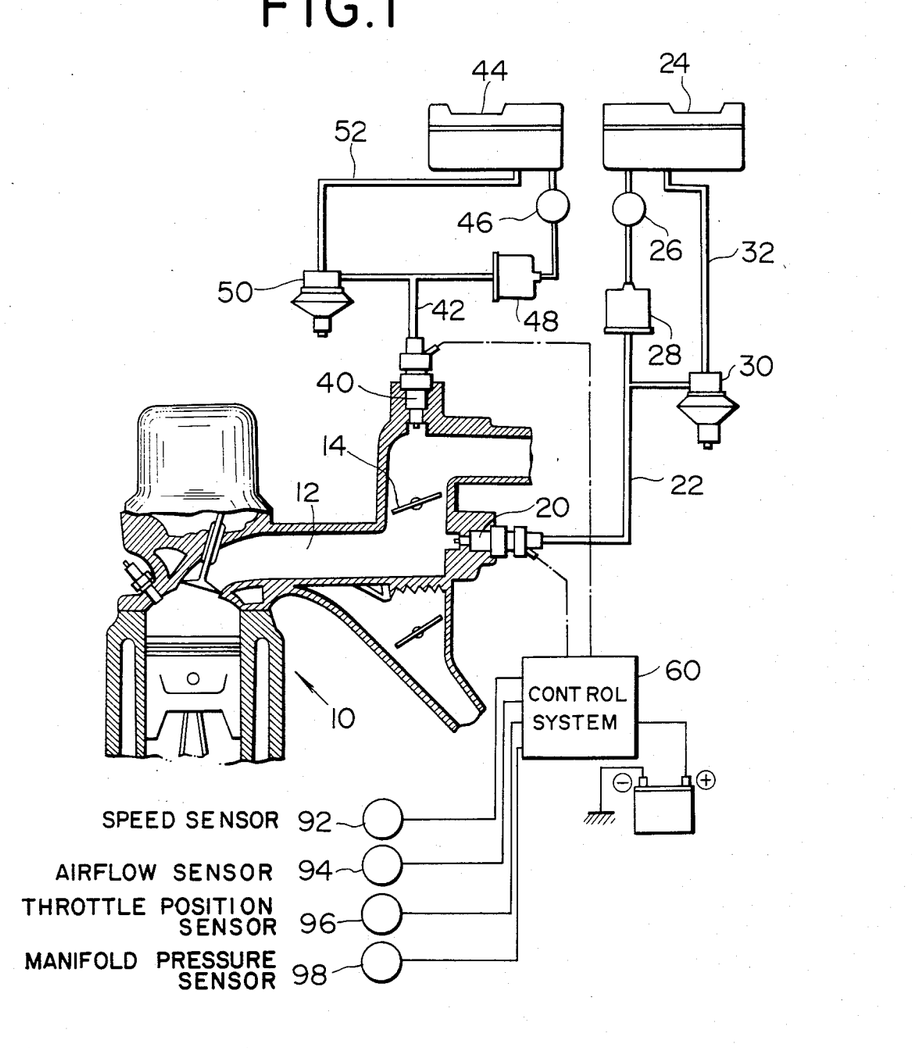
FIG. 1 is a schematic sectional view showing one embodiment of an internal combustion engine made in accordance with the present invention.

Referring now to FIG. 1, there is illustrated one embodiment of an automotive engine made in accordance with the present invention. The engine, generally designated 10, includes an intake passage 12 provided therein with a throttle valve 14. A gasoline fuel injector 20 is provided for discharging gasoline fuel into the intake passage 12 downstream of the throttle valve 14 under low and normal engine load conditions. The gasoline fuel is supplied under pressure through a gasoline fuel supply passage 22 from a gasoline fuel reservoir 24 containing therein gasoline fuel. The gasoline fuel supply passage 22 has therein a fuel pump 26 and a filter 28. The gasoline fuel supply passage 22 is connected downstream of the filter 28 to the fuel reservoir 24 through a return passage 32 which has therein a pressure regulator 30 for regulating the pressure of the gasoline fuel supplied to the gasoline fuel injector 20.

An alcohol fuel injector 40 is provided for discharging alcohol fuel into the intake passage 12 upstream of the throttle valve 14 under high load conditions. The alcohol is supplied under pressure through an alcohol fuel supply passage 42 from an alcohol fuel reservoir 44 containing therein alcohol fuel. The alcohol fuel supply passage 42 has therein a fuel pump 46 and a filter 48. The alcohol fuel supply passage 42 is connected downstream of the filter 48 to the fuel reservoir 44 through a return passage 52 which has therein a pressure regulator 50 for regulating the pressure of the alcohol fuel supplied to the alcohol fuel injector 40. It is to be noted that gas oil fuel may be used instead of such alcohol fuel.

The gasoline and alcohol fuel injectors 20 and 40 may be in the form of electromagnetically operated fuel injectors which are repeatedly energized for determined time periods to meter fuels supplied to the engine. Injection command pulses are generated each having a duration determined from existing engine operating parameters such a mass air flow into the engine, engine temperature, etc. The injectors are then energized, in response to the command pulses, to discharge fuels in synchronism with engine rotation, for example, once per engine crankshaft rotation.

A control system 60 is provided which generates injection command pulse signals to the gasoline and alcohol fuel injectors 20 and 40. The control system 60 is shown as having inputs from an engine speed sensor 92, an airflow sensor 94, a throttle position sensor 96, and a manifold pressure sensor 98. The control system 60 may have additional inputs from an engine temperature sensor, a vehicle battery voltage sensor, etc.

Figure 2:
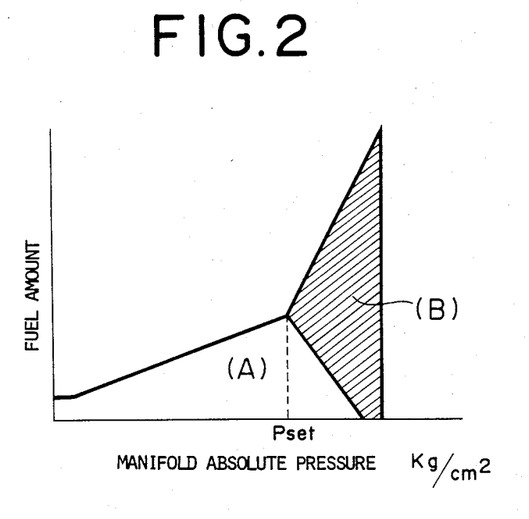
FIG. 2 is a graph showing variations in the amounts of gasoline and alcohol fuel discharged into the intake passage with respect to intake manifold absolute pressure.

Briefly, the control system 60 is constructed to control the gasoline and alcohol fuel injectors 20 and 40 as shown in FIG. 2. That is, the amount of the gasoline fuel discharged through the gasoline fuel injector 20 increases at a rate as the intake manifold absolute pressure increases until the intake manifold absolute pressure reaches a predetermined value Pset and thereafter decreases with increasing intake manifold absolute pressure, as indicated by the area (A) of FIG. 2. Alternatively, the alcohol fuel injector 40 starts discharging alcohol fuel at the predetermined value Pset of the intake manifold absolute pressure. As the intake manifold absolute pressure increases beyond $P_{set}$, the amount of the alcohol fuel discharged through the alcohol fuel injector 40 increases at a higher rate than that for increased gasoline supply with increasing pressure for pressures below $P_{set}$, as indicated by the area (B) of FIG. 2. The reason why the amount of the alcohol fuel discharged through the alcohol fuel injector 40 is required to increase at a rate higher than the rate at which the amount of the gasoline fuel discharged through the gasoline fuel injector 20 is that alcohol represents a calorific value lower than the calorific value of gasoline. For example, gasoline represents a calorific value of 10430 Kcal/Kg and methanol represents a calorific value of 4840 Kcal/Kg. There is an intake manifold absolute pressure range above the predetermined value Pset wherein both the gasoline and alcohol injectors 20 and 40 are in operation to discharge gasoline and alcohol fuels, respectively.

Preferably, the gasoline and alcohol fuel injectors 20 and 40 are selected to have different capacities so as to equalize the caloric values of the gasoline and alcohol fuels discharged therethrough when driven by injection command signals of the same pulse width from the control system 60. Namely, the injector 40 has more fuel discharging capacity than the injector 20 when both are driven by the same pulse width signal.

Figure 3:
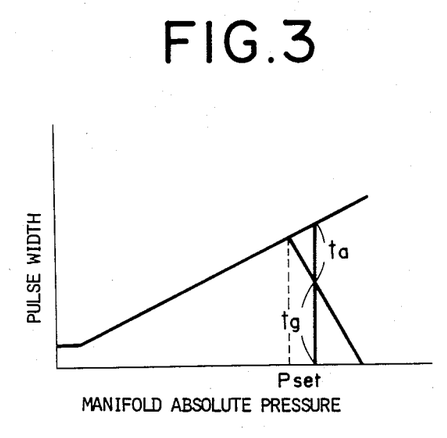
FIG. 3 is a graph of injection command signal pulse width based on gasoline fuel versus intake manifold absolute pressure, showing the relationship between the time when the gasoline fuel injector discharges gasoline fuel and the time when the alcohol fuel injector discharges alcohol fuel

FIG. 3 shows the relationship between the gasoline fuel injector "pull-in" time tg when the gasoline fuel injector 20 opens to discharge gasoline fuel and the alcohol fuel injector "pull-in" time ta when the alcohol fuel injector 40 opens to discharge alcohol fuel, with an assumption that the gasoline and alcohol fuel injectors 20 and 40 have different capacities to equalize the caloric values of the gasoline and alcohol fuels discharged through the gasoline and alcohol fuel injectors 20 and 40 when driven by injection command signals of the same pulse width from the control system 60. In this case, the basic pulse width (tg+ta) is determined based on the intake manifold absolute pressure on the assumption that only gasoline fuel is supplied. The ratio of tg and ta is then determined according to the manifold absolute pressure which corresponds to the engine load. This method is paticularly effective when the exhaust gas recirculation (EGR) system in which the exhaust gas is recirculated into the intake manifold is not employed, since the intake air flow rate can be calculated easily based on the intake manifold pressure, although it can be applied to an engine equipped with an EGR system.

Figure 4:
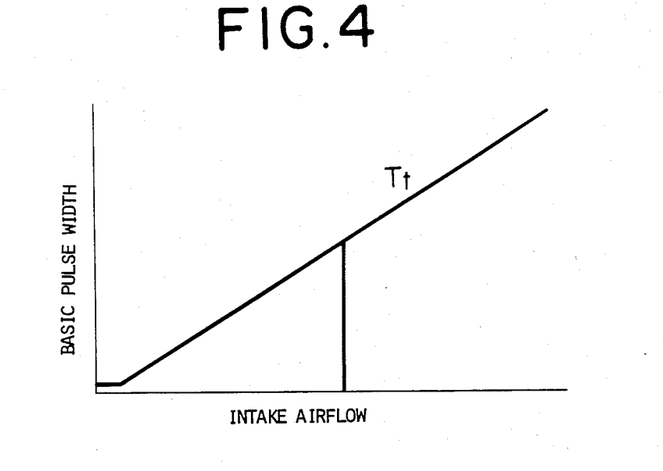
FIG. 4 is a graph of basic pulse width versus intake air flow, showing the relationship between the basic pulse width of the injection command signal and the mass air flow into the engine.

However, when the EGR system is adopted, it is preferable to determine the basic pulse width Tt by directly measuring the mass air flow rate into the engine. FIG. 4 shows the relationship between the basic pulse width Tt of injection command signals and the mass air flow rate into the engine.

Figure 4A:
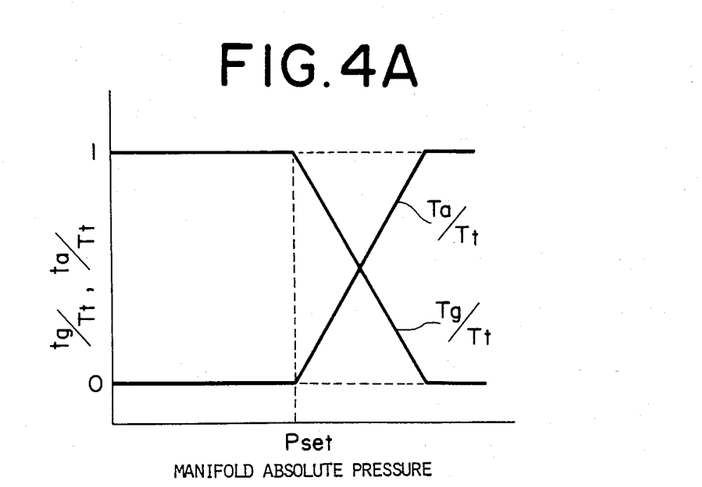
FIG. 4A is a graph showing the relationship between the ratio of the gasoline fuel injector pull-in time tg and the basic pulse widthh Tt and the intake manifold absolute pressure and the relationship between the ratio of the alcohol fuel injector pull-in time ta and the basic pulse width Tt and the intake manifold absolute pressure.

The basic pulse width Tt of the injection command signal is determined from measurement of the mass air flow rate into the engine. The ratios of the gasoline and alcohol injector pull-in times tg and ta to the basic pulse width Tt are determined based on the intake manifold absolute pressure respectively. FIG. 4A shows the relationships between tg/Tt and the intake manifold absolute pressure and between ta/Tt and the intake manifold absolute pressure. It is set that tg+ta=Tt. Therefore, the gasoline and alcohol fuel injector pull-in times tg and ta are dependent upon the basic pulse width Tt and the existing intake manifold absolute pressure. The pulse width Tg of the injection command signal applied to the gasoline fuel injector 20 which corresponds to the gasoline injector pull-in time tg may be determined from the following equation:

$$Tg = Tt \times \frac{tg}{ta + tg} \qquad (1)$$

The pulse width Ta of the injection command signal applied to the alcohol fuel injector 40 which corresponds to the alcohol injector pull-in time ta may be determined from the following equation:

$$Ta = Tt \times \frac{ta}{ta + tg} \qquad (2)$$

The control system 60 determines the pulse width values Tg and Ta from the above equations and provides injection command signals to the determined pulse widths to the gasoline and alcohol fuel injectors 20 and 40, respectively.

Under low load conditions, the gasoline fuel injector 20 is driven by the injection command signal with a pulse width Tg equal to the basic pulse width Tt to discharge gasoline fuel into the intake passage 12 downstream of the throttle valve, whereas the alcohol fuel injector 40 is out of operation so that the engine operates only on the gasoline fuel.

When the engine load increases to a predetermined value, the alcohol fuel injector 40 starts discharging alcohol fuel into the intake passage 12 upstream of the throttle valve 14 so that the engine operates on both the gasoline and alcohol fuels. The pulse widths of the injection command signals applied from the control system 60 to the gasoline and alcohol fuel injectors are calculated using the above equations (1) and (2), respectively.

Under high load conditions, the gasoline fuel injector 20 stops discharging gasoline fuel and the alcohol fuel injector 40 is driven by the injection command signal with a pulse width Ta equal to the basic pulse width Tt to discharge alcohol fuel into the intake passage 12 upstream of the throttle valve 14 so that the engine operates only on the alcohol fuel.

These control operations are carried out at high speed and with high accuracy by the control system 60 having therein a microcomputer.

The gasoline and alcohol fuel injectors 20 and 40 may be different in the caloric value of fuel discharged therethrough for the same injection command signal pulse width, in which case the pulse width Ta of the injection command signal to the alcohol fuel injector can be determined from the following equation:

$$Ta = Tt \times \frac{ta}{ta + tg} \times K \qquad (3)$$

wherein K is the correction factor dependent upon the differences in calorific value per unit, fuel pressure and fuel injection effective area between the gasoline and alcohol fuel injectors. For example, if the gasoline and alcohol fuel injectors are the same in the amount of fuel discharged therethrough for the same injection command signal pulse width, the correction factor K may be determined from the ratio of the gasoline calorific value to the alcohol calorific value.

That is, the control system 60 determines a basic value of the amount of the gasoline fuel sufficient to provide a caloric value required for the engine in response to the air flow rate to the engine. The control system 60 also determines a ratio between the amounts of the gasoline and alcohol fuel discharged into the intake passage 12 in response to engine load which is measured by the intake manifold absolute pressure. Then, the control system 60 determines the amounts of the gasoline and alcohol fuel discharged into the intake passage from parameters including the determined basic value and ratio so that the total of the caloric values of the gasoline and alcohol fuel discharged into the intake passage corresponds to the caloric value of the basic amount of gasoline fuel.

As shown in FIG. 1, the gasoline fuel injector 20 is preferably provided for discharging gasoline fuel into the intake passage 12 downstream of the throttle valve 14. This is effective for utilizing the pressure difference between the intake passage and the gasoline fuel reservoir 24 to assure a sufficient amount of gasoline fuel supplied to the engine even under a relatively low fuel pressure. On the other hand, it is desired to hold the alcohol fuel pressure in a relatively high range between 2 and 4 kg/cm$^2$, thereby avoiding vapor lock and percolation. Therefore, it is possible to use an inexpensive, low-pressure type fuel pump for the fuel pump 26 as compared to the case where both gasoline and alcohol fuels are supplied under the same pressure.

Since the engine operates mainly on alcohol fuel under high engine load conditions and there is no engine knock problem, it is preferable to increase the energy conversion efficiency by changing the compression ratio to a high value mechanically or by increasing the supercharge pressure when the engine load shifts from low load conditions to a high load condition.

Figure 5:
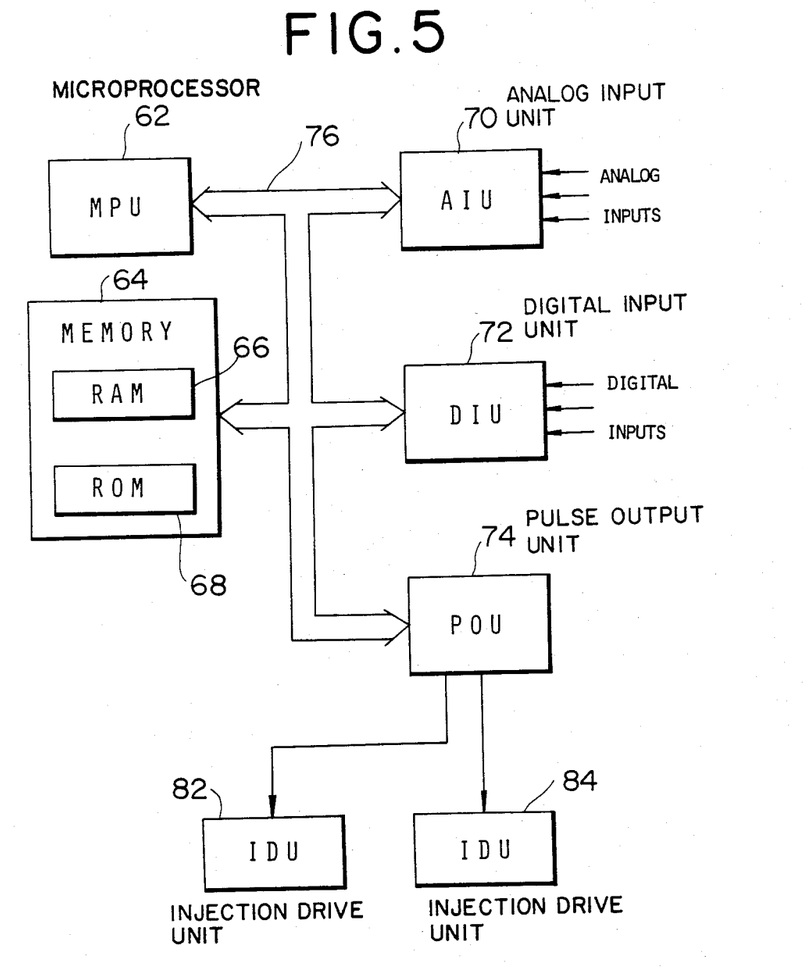
FIG. 5 is a block diagram showing the detailed structure of the control system of FIG. 1.
Figure 6:
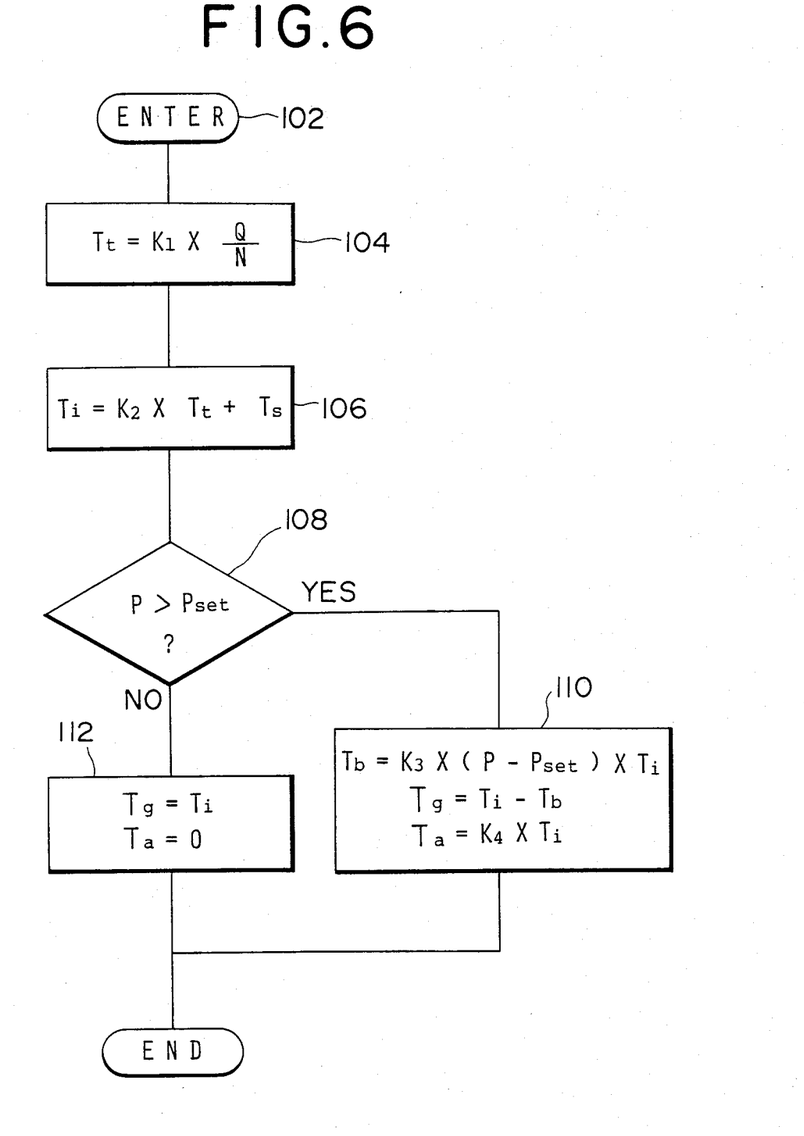
FIG. 6 is a flow diagram illustrative of the operation of the digital computer used in the control system.

Referring to FIGS. 5 and 6, the control system 60 will be described in greater detail. As shown in FIG. 5, the control system 60 includes a microprocessor (MPU) 62, a memory unit 64 having a read/write memory (RAM) 66 and a read only memory (ROM) 68, an analog input unit (AIU) 70, a digital input unit (DIU) 72, and a pulse output unit (POU) 74. The microprocessor 62 communicates with the rest of the system via a bidirectional data bus 76. The pulse output unit 74 provides commands to first and second injector drive units (IDU) 82 and 84 which thereby drive the gasoline and alcohol fuel injectors 20 and 40, respectively.

The analog input unit 70 includes an A/D converter which has analog inputs indicative of a plurality of engine parameters such as intake airflow, manifold vacuum, coolant temperature, and vehicle battery voltage and converts them into digital form. The digital input unit 72 has digital inputs from an engine speed sensor and switches operable according to engine operating conditions. The read only memory 68 contains the program for operating the microprocessor 62 to calculate the desired pulse widths of the injection command signals applied to the gasoline and alcohol fuel injectors 20 and 40.

FIG. 6 is a flow diagram of the programming of the digital computer included in the control system 60. The computer program is entered at point 102. At point 104 in the program, the digital computer calculates a value Tt for the basic pulse width by dividing the binary number representing the intake airflow Q by the binary number representing the engine speed N and multiplying the quotient by a constant K1. Following this, the calculated basic pulse width value Tt is corrected for the coolant temperature and battery voltage variations. Thus, at point 106 in the program, the calculation of Ti is made by multiplying the basic pulse width value Tt by a constant K2 dependent upon coolant temperature and adding to the resulting sum a correction factor Ts dependent upon battery voltage variation.

At point 108 in the program, a determination is made as to whether the manifold absolute pressure P is larger than a predetermined value Pset. If the answer to this question is "yes", then the program proceeds to a point 110 where a value Tb is calculated by subtracting the predetermined value Pset from the manifold absolute pressure value P, multiplying the resulting difference by the corrected basic pulse width value Ti, and multiplying the resulting product by a constant K3. At the point 110, the digital computer calculates a value Tg for the pulse width of the injection command signal applied to the gasoline fuel injector by subtracting the calculated value Tb from the corrected basic pulse width value Ti and also a value Ta for the pulse width of the injection command signal applied to the alcohol fuel injector by multiplying the calculated value Ti by a constant K4.

If the determination at the point 108 is "no", than at point 112, the pulse width Tg of the injection command signal to the gasoline fuel injector is determined to be equal to the value Ti calculated at the point 106 and the pulse width Ta of the injection command signal to the alcohol fuel injector is determined to be zero.

There is thus provided, in accordance with the present invention, an internal combustion engine operable on two kinds of fuel properly selected with high response to engine operating conditions. Its operation is smooth without any output torque variations at the change of selection of fuel from one kind to the other. The present invention can make efficient use of the advantages of both kinds of fuel and save gasoline without any reduction in engine drivability.

While the present invention has been described in conjunction with a specific embodiment thereof, it is evident that many alternatives, modifications and variations will be apparent to those skilled in the art. Accordingly, it is intended to embrace all alternatives, modifications and variations that fall within the spirit and broad scope of the appended claims.

What is claimed is:

1. In an internal combustion engine including an intake passage, a first fuel injector for discharging, into said intake passage, a first kind of fuel having a first calorific value, a second fuel injector for discharging, into said intake passage, a second kind of fuel having a second calorific value different from said first calorific value of said first kind of fuel, said first and second fuel injectors being repeatedly energized to discharge fuel for time periods corresponding to pulse widths of first and second injection command signals applied thereto, respectively, a method controlling the amounts of said first and second kinds of fuel discharged into said intake passage comprising the steps of:

determining a basic pulse width of said first injection command signal to provide a quantity of said first kind of fuel having said first calorific value required for said engine in response to air flow rate to said engine;

determining a ratio between the pulse widths of said first and second injection command signals in response to engine load;

determining the pulse widths of said first and second injection command signals from the determined basic pulse width and the determined pulse width ratio; and operating said first and second fuel injectors in response to said first and second injection command signals having the predetermined pulse widths, respectively, so that the total of the caloric values of said first and second kinds of fuel discharged corresponds to the caloric value of said quantity of said first kind of fuel corresponding to the determined pulse width of said first injection command signal.

2. A control method of claim 1, wherein said step of determining a basic pulse width of said first injection command signal includes the steps of dividing a value representing the intake air flow rate by a value representing the engine speed, and multiplying the quotient by a constant.

3. A control method of claim 2, which further comprises the step of correcting the determined basic pulse width for engine temperature and battery voltage variation.

4. A control method of claim 3, wherein said step of correcting the determined basic pulse width includes the steps of multiplying the determined basic pulse width by a constant dependent upon engine temperature, and adding to the resulting sum a correction factor dependent upon battery voltage variation.

5. A control method of claim 4, wherein said step of determining the pulse widths of said first and second injection command signals includes the steps of determining the pulse width of said first injection command signal to be equal to the determined basic pulse width and the pulse width of said second injection command signal to be zero when the engine load is below a predetermined value, and when the engine load is above the predetermined value solving the equations:

$$Tg = Ti - K1 \times (P - Pset) \times Ti$$

$$Ta = K2 \times Ti$$

wherein Tg is the pulse width of said first injection command signal, Ti is the corrected basic pulse width, P is the engine load, Pset is the predetermined engine load, Ta is the pulse width of said second injection command signal, and K1 and K2 are constants.

6. A control method of claim 5, which further comprises the steps of increasing the compression ratio of said engine when the engine load exceeds to the predetermined value.

7. An internal combustion engine including an intake passage provided therein with a throttle valve, comprising:

(a) a control system responsive to engine operating parameters for providing first and second injection command signals;

(b) a first fuel injector for discharging, into said intake passage, a first kind of fuel having a first caloric value for a time period corresponding to a pulse width of said first injection command signal from said control system;

(c) a second fuel injector for discharging, into said intake passage, a second kind of fuel having a second caloric value different from said first caloric value of said first kind of fuel for a time period corresponding to said pulse width of said second injection command signal from said control system; and (d) said control system including means for determining a basic pulse width of said first injection command signal to provide a quantity of said first kind of fuel having said first caloric value required for said engine in response to air flow rate to said engine, means for determining a ratio between the pulse widths of said first and second injection command signals in response to engine load, and means for determining the pulse widths of said first and second injection command signals from the determined basic pulse width and the determined pulse width ratio so that the total of the caloric values of said first and second kinds of fuel discharged corresponds to the caloric value of said quantity of said first kind of fuel corresponding to the determined pulse width of said first injection command signal.

8. An internal combustion engine according to claim 7, wherein said first fuel injector is provided for discharging gasoline fuel into said intake passage downstream of said throttle valve.

9. An internal combustion engine according to claim 7, wherein said second fuel injector is provided for discharging alcohol fuel into said intake passage upstream of said throttle valve.

10. An internal combustion engine according to claim 7, wherein said second fuel injector is provided for discharging gas oil into said intake passage upstream of said throttle valve.

11. An internal combustion engine according to claim 7, wherein said control system includes means for correcting said basic pulse width for engine temperature and battery voltage variations and means for determining the pulse widths of said first and second injection command signals from the corrected basic pulse width and the determined pulse width ratio.

12. An internal combustion engine according to claim 11, wherein said control system includes means for determining the pulse width of said first injection command signal to be equal to the determined basic pulse width and zeroing means for determining the pulse width of said second injection command signal to be zero when the engine load is below a predetermined value.

13. An internal combustion engine according to claim 12, wherein when the engine load is above the predetermined value, said control system zeroing means is operable for determining the pulse width of said first injection command signal from the following equation:

$$Tg = Ti - (K1)(P - Pset)(Ti)$$

wherein Tg is the pulse width of said first injection command signal, Ti is the corrected basic pulse width, P is the engine load, Pset is the predetermined engine load, and K1 is a constant, and for determining the pulse width of said second injection command signal from the following equation:

$$Ta = (K2)(Ti)$$

wherein Ta is the pulse width of said second injection command signal and K2 is a constant.

14. An internal combustion engine according to claim 13, which further comprises compression changing means for changing the compression ratio of said engine, and wherein said control system provides a command to said compression changing means to increase the compression ratio when the engine load exceeds the predetermined value.

15. An internal combustion engine including an intake passage provided therein with a throttle valve comprising:

(a) a first fuel injector for discharging, into said intake passage, a first kind of fuel having a first calorific value;

(b) a second fuel injector for discharging, into said intake passage, a second kind of fuel having a second calorific value different from said first calorific value of said first kind of fuel;

(c) a control system means responsive to various engine operating parameters for operating said first and second fuel injectors and separately controlling the quantities of said first and second kinds of fuel discharged into said intake passage and for injecting a combination of the quantities of the first and second kinds of fuel having a combined caloric value equal to a caloric value of a quantity of the first kind of fuel determined by engine operation, said control system means including first means operable for determining a basic quantity of said first kind of fuel to provide a caloric value required for said engine in response to air flow rate to said engine, said control system means including second means operable for determining a ratio between the quantities of said first and second kinds of fuel discharged into said intake passage in response to engine load, and third means operable for determining the quantities of said first and second kinds of fuel discharged into said intake passage from parameters including the determined basic value and ratio so that the total of the caloric values of said first and second kinds of fuel discharged corresponds to the caloric value of the basic quantity of said first kind of fuel.

16. An internal combustion engine according to claim 15, wherein said control system means provides first and second injection command signals to said first and second fuel injectors, respectively, said first means comprising first pulse means for determining a basic pulse width in response to air flow rate to said engine, said second means comprising second pulse means for determining a ratio between the pulse widths of said first and second injection command signals in response to engine load, and said third means comprising third pulse means for determining the pulse widths of said first and second injection command signals from the predetermined basic pulse width and the determined pulse width ratio, and wherein said first and second fuel injectors comprise electromagnetically operated fuel injectors repeatedly energized to discharge fuel for time periods corresponding to the pulse widths of the first and second injection command signals, respectively.

17. An internal combustion engine according to claim 15 or 16, wherein said first fuel injector is provided for discharging gasoline fuel into said intake passage downstream of said throttle valve.

18. An internal combustion engine according to claim 15 or 16, wherein said second fuel injector is provided for discharging alcohol fuel into said intake passage upstream of said throttle valve.

19. An internal combustion engine according to claim 15 or 16, wherein said second fuel injector is provided for discharging gas oil into said intake passage upstream of said throttle valve.

20. An internal combustion engine according to claim 16, wherein said first pulse means is operable for correcting said basic pulse width for engine temperature and battery voltage variation and said third pulse means is operable for determining the pulse widths of said first and second injection command signals from the corrected basic pulse width provided by said first pulse means and the determined pulse width ratio provided by said second pulse means.

21. An internal combustion engine according to claim 20, wherein said third pulse means is operable for determining the pulse width of said first injection command signal to be equal to the determined basic pulse width and for determining the pulse width of said second injection command signal to be zero when the engine load is below a predetermined value.

22. An internal combustion engine according to claim 20 or 21, wherein when the engine load is above a predetermined value, said third pulse means is operable for determining the pulse width of said first injection command signal from the following equation:

$$Tg = Ti - K1 \times (P - Pset) \times Ti$$

wherein Tg is the pulse width of said first injection command signal, Ti is the corrected basic pulse width, P is the engine load, Pset is the determined engine load, and K1 is a constant, and for determining the pulse width of said second injection command signal from the following equation:

$$Ta = K2 \times Ti$$

wherein Ta is the pulse width of said second injection command signal and K2 is a constant.

23. An internal combustion engine according to claim 22, which further comprises compression changing means for changing the compression ratio of said engine, and wherein said control means provides a command to said compression changing means to increase the compression ratio when the engine load exceeds the predetermined value.

* * * * *